R. F. CHAPMAN 3,187,318

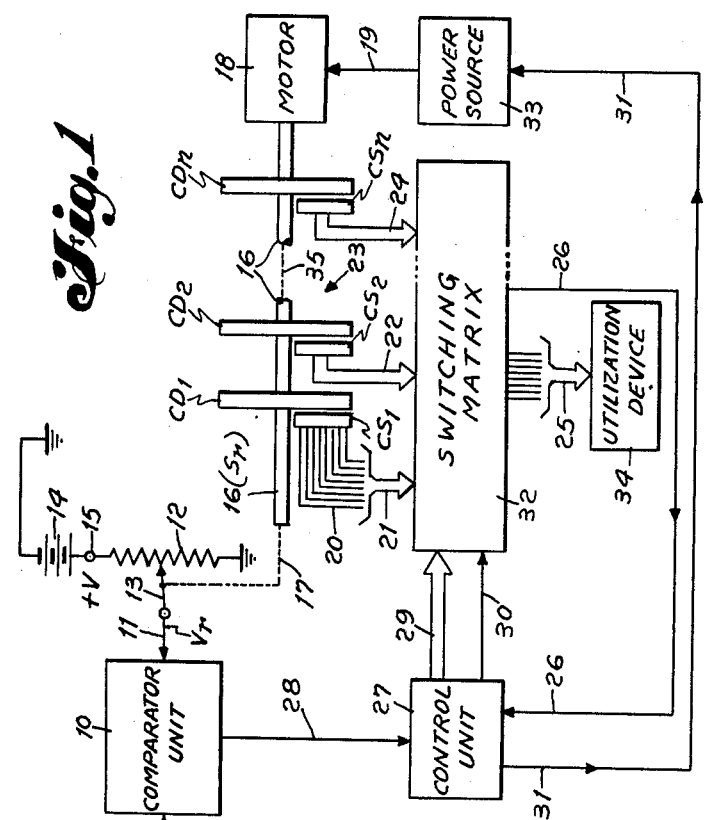
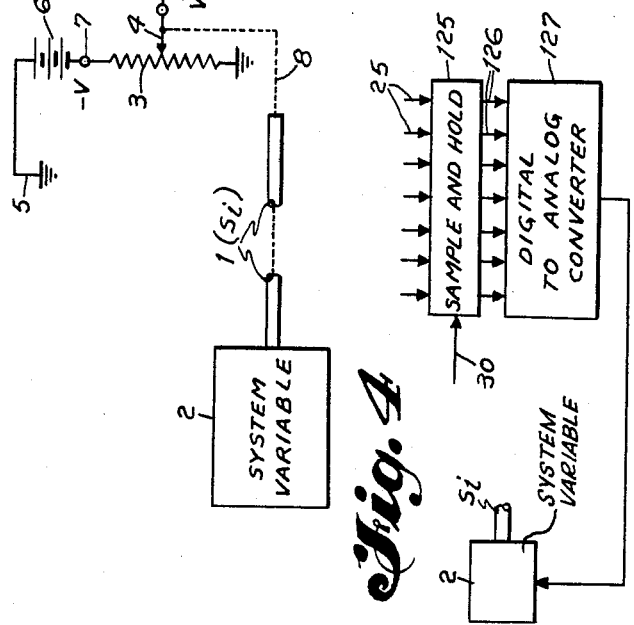
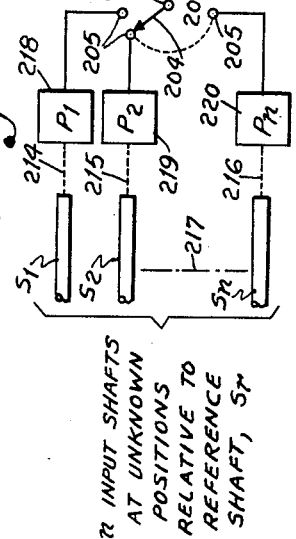
INVENTOR.
RICHARD F. CHAPMAN
BY Robert Lieber
ATTORNEY June 1, 1965

FUNCTION ENCODING SYSTEM

Filed May 17, 1960

INVENTOR.
RICHARD F. CHAPMAN
BY Robert Lieb
ATTORNEY

United States Patent Office 3,187,318
Patented June 1, 1965

3,187,318
FUNCTION ENCODING SYSTEM
Richard F. Chapman, Nutley, N.J., assignor to International Telephone and Telegraph Corporation, Nutley, N.J., a corporation of Maryland
Filed May 17, 1960, Ser. No. 29,710
4 Claims. (Cl. 340—204)

This invention relates generally to signalling systems; and particularly, to systems for digitally signalling information relating to the position of a movable member, and especially according to a predetermined non-linear function of said position.

It has long been a problem, in connection with such movable member encoding systems, that the means utilized to encode according to the position of the movable member invariably loads, and thereby more or less inhibits movement of the member. Where the movable member is controlled by a system variable as, for example, the position of a machine tool, or the like, and must therefore respond sensitively to changes in the variable, it becomes increasingly important to minimize the loading on the member.

In certain related devices, both the aforementioned movable member and a reference member are mobile, the latter being moved independently of the former. A problem inherent in such devices concerns the inherent requirement of accurate means for timing the motion of the reference member as it moves in relation to the movable member under consideration. In the present invention this problem is avoided utilizing an arrangement which does not have timing accuracy restrictions.

Another problem frequently encountered in signalling systems of the type under consideration, relates to encoding according to a selected non-linear function of the position of a movable member. In most such devices, it is not feasible to include a plurality of different and selectible function generating elements because of the complexity and prohibitive size of the equipment required for each function to be signalled.

A third problem associated with prior encoding devices concerns the correction of ambiguous code signals associated with critical positions of a movable member, these being positions at which the digital outputs of associated sensing elements are uncertain because of the location at such positions of boundary discontinuities between successive code values. Prior art encoding systems require two relatively exclusive sets of sensing elements for ambiguity elimination, and associated switching logic for determining the set which is to be read out at any given position. The use of two sets of sensing elements and associated switching connections unduly complicates the design of the encoder.

Accordingly, it is an object of this invention to provide an improved system for encoding information relating to a function of the position of a movable member, especially one in which the function to be encoded is selectible from a plurality of available encoding members.

Another object is to provide an encoding system, of the type described, having no critical timing accuracy restrictions.

It is another object of this invention to provide an encoding system requiring a minimal amount of sensing apparatus avoiding ambiguities arising at adjacent code value positions.

Still another object is to provide a system for encoding according to the position of a movable member, wherein the movable member is minimally loaded by the encoding apparatus.

In accordance with the foregoing objects, a feature of this invention concerns the provision of a selectively movable reference member having a plurality of encoding members associated therewith; each encoding member being arranged to digitally signal according to a different function of the displacement of the reference member; and corresponding sensing members communicating individually with the encoding members. An input movable member whose position, or a selected function thereof, is to be encoded, is moved in accordance with a system variable. A comparator unit is provided for comparing displacements of the input and reference movable members from predetermined reference positions thereof. When the reference and input movable members are at predetermined relative displacements, the comparator provides a unique output signal which serves to enable the reading out of digital signals, from a pre-selected one of the sensing members to a utilization device, such as a display or indicating unit, or the like, thus transferring digital values which vary according to a selected function of the position of the input member.

These and other objects and features of the invention will be more readily appreciated in consideration of the following description taken in connection with the attached drawings wherein:

FIG. 1 is a block and schematic drawing of a system arranged in accordance with the teachings of this invention.

FIG. 2 is a detailed schematic of the comparator unit 10 of FIG. 1.

FIG. 3 is a detailed view in perspective of two of the encoding members on shaft $S_r$ of FIG. 1 and a detailed schematic of the control unit and switching matrix circuits connected thereto.

FIG. 4 is a schematic drawing illustrating one application of the subject invention, in association with a digital servo for varying the displacement of an input movable member at a rate functionally related to the instantaneous position of the input member.

FIGS. 5 and 5a are respective elevation and front views of an alternative arrangement for comparing the relative displacements of the input and reference movable members of this invention, and for signalling predetermined relative displacements.

And FIG. 6 is a schematic and block drawing of an arrangement, in accordance with this invention, for encoding according to a selected one of a plurality of functions of the position of a selected one of a plurality of movable members.

Referring to FIG. 1, a preferred embodiment of this invention includes an input shaft $S_i$ and a reference shaft $S_r$, controlled respectively by a system variable 2; such as, for example, the rotation of a motor or a galvanometer pointed; and a controllable motor 18. The shafts $S_i$ and $S_r$ are respectively indicated by the numerals 1 and 16. Shafts 1 and 16 are respectively coupled to linear potentiometers 3 and 13. Potentiometer 3 is grounded at one end thereof, as indicated in the figure and, at the other end, the potentiometer is connected to the negative terminal 7, of a voltage source 6. The positive terminal of source 6 is grounded, as at 5, completing the potentiometer circuit. Thus, at the junction 7, between source 6 and potentiometer 3, a negative voltage, $-V$, is maintained with respect to the ground potential reference.

Similarly, shaft $S_r$ is coupled to potentiometer 12, which is connected between the positive terminal of a voltage source, 14, and ground, as indicated. The outputs of potentiometers 3 and 13 appear on conductors 9 and 11, respectively. These outputs are D.C. voltages, referenced to ground, which vary linearly with the angular displacements of the respective shafts from reference positions associated respectively with each of the shafts.

The potentiometer output voltages on conductors 9 and 11 are coupled to high impedance inputs of a comparator unit 10, having an output conductor 28. The electrical signal on conductor 28 is a normally quiescent D.C. signal level which is uniquely interrupted by a pulse variation when, and only when, the reference shaft is rotated through a position at which the reference and input shafts are at predetermined relative displacements with respect to their respective references. The unique pulse variations on conductor 28 are coupled to a control unit 27 which, as described hereinafter, provides readout signals which control the reading-out of digital code signals from encoding units associated with the reference shaft, $S_r$.

Each of the above-mentioned encoding units associated with the reference shaft generally comprises a rotatably mounted encoding member CD; such as, for example, a disc having a plurality of variably conductive concentric code channels; and a relatively stationary code sensing member CS having a corresponding plurality of code sensing elements coupled individually to the above-mentioned code channels, for sensing the electrical conditions thereof.

As indicated in FIG. 1, a plurality of such encoding units are coupled to the shaft $S_r$, each including a plurality of rotatably mounted encoding members embodied in code discs $CD_1$ to $CD_n$, inclusive, and a corresponding plurality of code sensing members, $CS_1$ to $CS_n$, inclusive, which communicate individually with the correspondingly numbered discs. This communication may involve, as in the present instance, actual physical contact between stationary wiper arms which serve as the code sensing elements of each code sensing member, and corresponding concentric regions of the contacted code discs, the latter being further subdivided into patterns of electrically conductive and non-conductive arc segments, for respectively breaking and making circuit connections in series with the wipers in accordance with a desired code. Each of the above-mentioned discs is coded in a different code pattern arrangement wherein the associated outputs of the sensing members represent digital quantities which vary as correspondingly different functions of the displacements of the reference shaft $S_r$ from the aforementioned reference position thereof. For example, in one application of this invention, a pattern on one of the coded discs CD is arranged to digitally signal according to the function $\log 1/x$, where $x$ is the angular displacement of the reference shaft $S_r$ from its aforementioned reference position. Similarly, other discs may be arranged to digitally signal according to the linear function $x$, and other non-linear functions, such as $\log x$, $\sine x$, and the like. The outputs of the code sensing members are indicated respectively at 20, 22, 23 and 24 in the figure, numeral 23 serving to identify output conductor sets corresponding to other encoding members not shown. A typical arrangement of output conductors is shown at 20, wherein an 8 element sensing member is connected to 8 output conductors shown at 20, and the output conductors are combined in a diagrammatic conductor group illustrated at 21. Similarly, the double-arrows at 22 and 24 represent sets of eight conductors issuing respectively from the 2nd and $n$th sensing members as shown. While the sensing members are shown as stationary units with output conductors issuing therefrom, it should readily be appreciated that the reverse situation, in this instance, is equally feasible. Namely, it is permissible, in connection with this invention, to have rotatably mounted sensing members and fixed coding discs, or any other compatible code signalling transducer arrangement, in association with the reference shaft. The output conductor sets at 21, 22, 23 and 24 are coupled to a switching matrix 32 having 8 output conductors issuing therefrom. Seven of the 8 output conductors of switching matrix 32 are shown as a group at 25, while the 8th output conductor is individually identified at 26. The 8 output conductors 25 are selectively and exclusively connectable in sets to corresponding conductors of the output sets at 21, 22, 23 or 24, through the switching matrix 32, as determined by selection control signals applied to the matrix through a set of conductors schematically designated at 29, and a read-out signal conductor 30 which controls the overall read-out signal transfer through all of the selectable connections of the matrix.

The output signals on conductors 25, conveying the selected digital intelligence of the system, are coupled to a utilization device 34, such as a digital printer or display system, or the like. Conductor 26, bearing code boundary ambiguity intelligence (as explained hereinafter), is coupled to the control unit 27. Each ambiguity signal appearing on conductor 26 serves to disable gating circuits in the control unit, in a manner to be described, and thereby serves to delay the application of read-out signals to conductor 30 in response to the aforementioned unique pulse variations on conductor 28. Thus, the output on conductor 30, in response to a unique pulse signal on conductor 28, is delayed until the angular displacement of shaft $S_r$ is additionally varied to avoid the ambiguity indicated by a concurrent ambiguity mark signal on conductor 26. It should be noted that the last mentioned operation is feasible only because of the relatively independent movement of the shaft $S_r$. In contrast, the input shaft $S_i$, being controlled by a system variable, is relatively fixed in position at the time of a commanded read out.

The motor 18 is controlled selectively by means of a source of power 33 coupled thereto. Power source 33 is, in turn, selectively actuated by signals appearing on output conductor 31 of control unit 27. Here again, for the purposes of this invention it should be noted that a motor, such as motor 18, is by no means the exclusive mode of operation contemplated. It is equally feasible, where the input shaft position changes at a very slow rate, to provide for manual actuation of shaft 16 by means of a crank or similar member connected thereto.

Accordingly, it should now be understood that the position of shaft $S_r$ is completely determinable at all instants of time, while that of shaft $S_i$ is relatively indeterminate due to the variable condition controlling the shaft. The digital quantity transferred from the selected code disc on shaft $S_r$ through the matrix 32 is, as previously indicated, determined at the instant that comparator 10 signals relatively equal displacements of the shafts $S_i$ and $S_r$. Further, as previously noted, this operation is delayed by the control unit of the present invention, in response to ambiguity signals transferred from the matrix 32, to the control unit, through conductor 26. These signals, hereinafter termed ambiguity marks, are obtained from a predetermined conductor of the sensing member output conductor set selected through the matrix 32, whenever the position of the selected member, relative to the corresponding selected code disc, is ambiguous or indeterminate due to the existence of a boundary between two code values at such position.

The foregoing may be more fully appreciated upon consideration of FIG. 3, wherein typical code discs $CD_1$ and $CD_2$, and the corresponding code sensing members $CS_1$ and $CS_2$, are illustrated in a perspective view. Members $CS_1$ and $CS_2$ each include eight sensing elements, which are coupled, as shown, by means of conductors generally designated 109 and 110 to corresponding sets of switch contacts 111 and 112. The switch contact sets 111 and 112 are controlled by the condition of relays $RY_1$ and $RY_2$, respectively. That is, upon operation of relay $RY_1$, all of the contacts 111 are made, and when the relay is released, the contacts are broken. It should readily be understood that the relays are illustrated solely by way of example, and many equivalent modes of operation are equally suitable herein. For example, the contacts 111 and 112 may be replaced by diodes or transistors controlled in sets by other diodes or other suitable coactive elements. It should be readily understood that the output conductors of all of the other disc sensors CS are similarly brought out in parallel sets to a gating terminus similar to the relay contact sets 111 and 112. The outputs of all such gates are connected in parallel as shown at points 120 through 127 inclusive in the drawing. It should further be noted that the gating sets thus far described, are relatively exclusive in operation; that is, when any given set of connections is made, all of the other sets are broken. Each of the discs $CD_1$ and $CD_2$ includes a code pattern of conductive and non-conductive segments (or means for transmitting any other binary valued signal conditions), the pattern being radially arranged in seven concentric channels 131, as shown. An eighth channel, situated in the outer-most ring of the discs, also contains a unique arrangement of discrete conductive and non-conductive areas. The sensing elements of the members $CS_1$ and $CS_2$, associated with the respective channels are situated directly over respective regions through which the concentric channels pass as the code disc is rotated. The seven intelligence bits associated with a function of the position of the code disc are indicated at 131, while the markings 130, in the outer-most channel are radially aligned with and thereby indicative of the location of discrete variations in any of the seven intelligence channels, thus identifying regions of possible ambiguities associated with a corresponding change in code value at such locations. As indicated in the figure, the outer-most sensing elements associated with the outer-most (ambiguity mark) channels are coupled to terminal 127 and thence to conductor 26, through the respective switch contacts associated with these elements. The intelligence signal outputs at terminals 120 through 126 are applied in parallel to a second set of gates 135, controlled by signals on conductor 30, as shown. Upon the occurrence of an enabling signal on conductor 30 all of the inputs to the gates 135 are translated in parallel to the outputs 25 thereof. As indicated in the figure, the illustrated code discs $CD_1$ and $CD_2$ are arranged circumferentially in a non-uniform code pattern to indicate the non-linear relationship between the coding of the discs and the angular position of the discs. It should readily be appreciated that the pattern may be arranged in uniform segments and still be non-linear in the sense that variations in the code values from segment to segment may be unequal. Hence, it should be readily understood that the arrangement of unequal coded arc segments is shown merely for illustrative purposes and is not a limitation upon this invention. The signals on conductor 30 which enable the translating gates 135 are obtained from a logical gating circuit including an oscillator 118 having an output conductor, bearing signals designated C, coupled to a logical gating circuit 119. A flip-flop 115, having an output conductor bearing a binary-valued signal designated A, is coupled to a second input of the aforementioned logic circuit 119, and conductor 26 bearing the binary-valued selected ambiguity mark signal is connected to a third input of the gating circuit 119. Circuit 119 serves to translate one of the pulses from oscillator 118 to the conductor 30, when the signal A at the output of flip-flop 115 and the signal B on conductor 26 are coincidentally at predetermined values. The oscillator pulse thus passed through the gate will then be applied to one of the input sides 117 of flip-flop 115 to reverse the condition of the signal A, by reversing the condition of the flip-flop. The signal A is established in the gate enabling condition by the aforementioned unique comparator output signals on conductor 28, which are coupled to input side 116, of the flip-flop. It will be recalled that the signal thus coupled through conductor 28 is derived from the comparator unit 10 when the reference and input shafts are in a predetermined relation. This predetermined relation, in the present instance, comprises equal angular displacements of the two shafts from fixed reference positions thereof; although in other applications other relationships may govern the operation of the comparator. To summarize the operation of gating circuit 119, when a signal occurs on conductor 28, the flip-flop 115 is conditioned to a state wherein the signal A enables the gate 119 to translate signals from output C of oscillator 118 to conductor 30, providing that no ambiguity mark signal is present on conductor 26 due to an ambiguity mark 130 on the selected code disc. If an ambiguity mark signal is present on conductor 26, then no oscillator signals will pass through the gate until such time as the ambiguity mark signal has terminated due to an additional rotation of the shaft 16 away from the ambiguous position. In either event, the first oscillation passing through gate 119 is coupled by means of conductor 122 back to flip-flop 115, so as to deactivate the gate 119 by resetting the flip-flop through side 117. Thus, one and only one pulse will appear on conductor 30 in response to a comparator output signal on conductor 28, and the single pulse thus obtained will invariably occur out of coincidence with any ambiguity mark signal which may be present at the time of a comparator output. Thus, it is seen that the overall operation thus far described includes the selection of one set of code sensing elements associated with one of a plurality of code discs mounted on a reference shaft, and the unambiguous transfer of the signals received through the selected sensing elements, when the reference shaft is in a predetermined position relative to the input shaft. The position of the input and reference shafts are respectively determined by a system variable and a selectively operated source of rotational power, the latter providing means for independently rotating the reference shaft relative to the input shaft so as to pass the former through the required read-out, or signal transfer, position.

Thus far, no mention has been made of the specific conditions of the shaded and unshaded code areas of the illustrated discs. Actually, the shaded areas may be either conductive or non-conductive, providing that the output circuits are designed to properly receive the resultant output signals. Assume, for example, that the shaded areas are conductive and that the output signals resulting from conduction through the selected sensing elements are conveniently designated as binary "one" signals, while opposite-valued signals are designated binary "zero." It follows that the ambiguity mark signals will appear as binary "one" values. If gate 119 is to be enabled by binary "one" signals, then the ambiguity mark signal must be inverted in sense before it affects the gate output. On the other hand, if binary "one" signals disable the gate 119, it is obvious that the gate 119 may be a simple AND gate. Accordingly, it is to be understood that the convention utilized to represent opposite code bit values on the code discs is of no consequence, providing that the circuits responsive to the resultant code signals utilize a corresponding convention.

Referring to FIG. 2, a preferred embodiment of the comparator unit 10, as shown therein, includes equal-valued summing resistors 40 and 41 connected in series between the conductor 9 and 11, the latter being coupled respectively to the potentiometers associated with the input and reference shafts of FIG. 1. The junction between resistors 40 and 41 is coupled to a crossover detection network including three transistor amplifier stages. The first transistor stage is an emitter follower arrangement including an NPN transistor 47, having its collector connected to a source of relatively positive D.C. potential 50, and further having its emitter resistor coupled, through a "zero" adjustment network, to ground, the latter network providing means for adjusting the "firing" point of the output of the next stage. The second transistor stage is a transistor amplifier including an NPN transistor 48 having its base coupled to the emitter of the preceding stage, through a coupling resistor and further having its collector coupled through a load resistor to the source 50. The emitter of transistor 48 is coupled to the aforementioned "zero" adjustment network. The last stage is an amplifier including a PNP transistor 49 having its emitter connected to the source 50, and its collector coupled through a load resistor, to ground. The output of the last stage 3, taken at the junction between the aforementioned load resistor and collector of transistor 49, is connected to the conductor 28 which couples the comparator output signal to the flip-flop 115, of FIG. 3.

In operation, the comparator 10 receives signals from conductors 9 and 11 which vary in response to the positions of the input and reference shafts, respectively. These signals are summed in resistors 40 and 41, and the resultant sum signal appears at the junction 46 between these resistors. The emitter follower including resistor 47 thus provides an output signal which follows a predetermined portion of the input signal variation. More specifically, the signal at junction 46, in response to a continuous revolution of the reference shaft, will include a somewhat linear variation as shown at 54, the minimum and maximum variational values being indicated respectively at 55 and 56. It should be noted herein that the linearity of the variation at 54 is of no consequence in this application, providing that the variation occurs at a rate sufficient to produce the required output trigger. The signal value graphically indicated at 55, is a negative value in relation to the bias at the emitter of transistor 47, and the value at 56, is a positive value with respect to the aforementioned bias, these values being chosen to correspond respectively to extreme positions of the input shaft. The bias at the emitter of transistor 47 is such that when the reference shaft is rotated to a position at which a comparator or output variation is to occur, an output variation at the emitter will be initiated. That is, when the sum signal at junction 46 attains a "zero" value, the output at the emitter of transistor 47 will begin to follow the input to the base of the transistor. The instant at which this variation begins is indicated at point 58 of the illustrative signal shown in waveform 57, in the figure, and the variation terminates as at 59 in waveform 57, in coincidence with the termination 56 of waveform 54. As soon as the output variation of transistor 47 begins, as at 58, the following amplifier stage, being a high gain transistor amplifier stage, begins to conduct heavily, and almost immediately, transistor 48 is conducting saturation current. The resultant output at the collector of transistor 48 is shown in waveform 60, as an abrupt negative going signal. This negative going signal "turns on" the following stage, thereby producing an abrupt positive going waveform at the collector of transistor 49, and it is this abrupt positive going signal variation which appears on conductor 28 and produces a reversal in state of the flip-flop 115, by reversing the condition of side 116 of the flip-flop. The point at which the signal 54 at junction 46 "crosses over" from a negative to a positive value is, as previously indicated, determined by the rotational displacements of the input and reference shafts, and it also depends upon the relative magnitudes of the voltages provided by the sources 6 and 14 of FIG. 1. In this application, the potentials provided by the aforementioned sources, 6 and 14, are of equal and opposite values, although it should be clearly understood that the invention is not restricted to such a choice of values. Although a specific comparator has been illustrated and discussed, it should readily be understood that other comparison circuits may readily be substituted for the illustrated circuit without unduly affecting the present operation. For example, a multiar comparator, such as that shown on pp. 468–473 of "Pulse and Digital Circuits," J. Millman and H. Taub, McGraw-Hill, 1956, provides a compatible and equivalent function. Although the multiar circuit requires a negative going signal for zero crossover detection, this does not affect the previously described functioning of the system under consideration, since the direction of rotation of the reference shaft may be reversed, thereby providing a negative going signal at the comporator input, without otherwise altering the system operation.

Referring to FIG. 4, a unique application of the system described in connection with FIG. 1, is schematically illustrated therein. As indicated in the figure, the seven conductors 25, which are the output intelligence signal conductors of the switching matrix 32, of FIG. 1, are coupled to a sample and hold circuit 125, which receives the intelligence signals on conductors 25 in response to read-out pulses on conductor 30, and stores seven signals representative of the associated intelligence until the next read-out pulse is received. The pulses on conductor 30 are obtained as previously described in connection with FIG. 4. The signals stored in circuit 125 are applied to seven output conductors 126, these being coupled to a digital to analog converter 127, which converts the corresponding seven bit digital numbers to discrete voltage levels at corresponding amplitudes. The resultant discreted voltage levels are coupled by means of a conductor 128 to the controls of the system variable 2, thereby causing the input shaft $S_i$ to rotate at a rate proportional to the amplitude of the signal on conductor 128. Thus, depending upon which code disc on the reference shaft $S_r$ has been selected through the martix 32 of FIG. 1, the angular velocity of the shaft $S_i$ will vary as a corresponding selected function of the position of shaft $S_i$. Such devices are useful, for example, as variable function generators in incremental computers, or as "look-up tables" in ordinary digital computers.

Referring to FIG. 5, an alternative apparatus for comparing the positions of the reference and input shafts of this invention, includes a first comparison member 141 mounted on the reference shaft $S_r$, and a second comparison member 140 mounted on the input shaft $S_i$, as shown. That portion of member 140, which faces the member 141, is covered by a light absorbent material. At one point along this portion, a tiny mirror 147 is mounted.

The member 141 further includes a compartment 142, containing a source of light 143, and a photo cell 146, as shown in FIG. 5a, which is a front view of the member 141 as viewed from the member 140. An opaque wall 144 divides the chamber 142 into two compartments, one containing the light source 143 and the other containing the photo cell 146. This wall thereby isolates the light source from the photo cell. Since the surface of member 140 tends to absorb the light emanating from source 143, photo cell 146 will remain unenergized until the reference shaft is rotated to a posiiton where light reflected from mirror 147 impinges on photo cell 146, energizing the cell. By properly arranging the source 143, the photo cell 146 and the mirror 147, the desired relative position of the shafts will be signaled by the photo cell in the form of an output variation on conductor 147 connected thereto. Conductor 147 may thus be substituted for the conductor 28 in the arrangement of FIGS. 1 and 3. This arrangement is most useful in applications wherein the input shaft, $S_i$, is to be minimally loaded; as, for example, where the position of a galvanometer pointer, or a function thereof, is to be digitally displayed or otherwise utilized in digital form.

In FIG. 6, apparatus for enhancing the utility of the functional code disc array on the reference shaft $S_r$, of FIG. 1, is illustrated. As shown in FIG. 6, a plurality of potentiometer elements $P_1, P_2 \ldots P_m$, are coupled to a corresponding plurality of input shafts $S_1, S_2 \ldots S_m$. These input shafts are controlled by different variables and are therefore at relatively independent and unrelated angular displacements. The potentiometers are energized in parallel, as in FIG. 1 through a voltage source which is not shown in FIG. 6. The variable outputs of the potentiometers are coupled to stationary contacts 205, of a switch 203. The wiper arm 204, of switch 203, is thus utilized to variably select the potentiometer output representative of the position of the input shaft whose associated variable is to serve as the independent variable for the selected function generating disc of the reference member $S_r$. Shaft $S_r$, as in FIG. 1, is coupled to a linear potentiometer 206, which, in turn, is coupled to the comparator 10, as shown. The other input to comparator 10 is provided through conductor 202 which is connected to wiper arm 204 of switch 203. The remainder of the system is the same as that previously described in connection with FIGS. 1 to 4. Accordingly, when the reference shaft is rotated through an angular displacement corresponding to that of the input shaft selected through switch 203, a comparator output variation appears on conductor 28, and the output of a selected one of the functional encoding discs on the shaft $S_r$, is translated as in the manner previously described in connection with FIG. 3. Thus, the utility of the arrangement previously described, is extended, in the apparatus of FIG. 6, to permit a single reference shaft, $S_r$, to service a multiplicity of input shafts $S_i$.

While the fundamental novel features of the invention have been illustrated and described in connection with the foregoing, it should be readily apparent that many modifications thereof may be made without departing from the true scope and spirit of the invention, and such modifications are intended to be covered by the following claims.

I claim:

1. A system for encoding according to a function of the position of a movable member comprising an input movable member and a reference movable member, each having an associated reference position; means for producing a control signal only when the relative displacements of said input and reference members from said respectively associated reference positions correspond; an encoding member mounted on said reference movable member, said encoding member including a plurality of digit signal channels and an ambiguity mark channel; a stationary sensing member coacting with said encoding member to transfer digit signals representing a numerical value which varies according to a predetermined function of the position of said reference movable member from said digit signal channels, said sensing member also operating to transfer ambiguity mark signals from said ambiguity mark channel; means coupled to said control signal producing means and said sensing member and responsive to said control signals to immediately transfer said digit signals from said sensing member providing said ambiguity mark signal is absent, or, to transfer said digit signals upon termination of said ambiguity mark signal if said ambiguity mark signal is present coincidentally with said control signal; and means for independently moving said reference movable member in relation to said input movable member.

2. A position encoding system comprising an input movable member and a reference movable member, each having an associated reference position; a plurality of encoding members adjustably mounted on said reference movable member, each said encoding member including a plurality of digit signalling channels; a corresponding stationary sensing member coacting with each said encoding member, each said sensing member including a plurality of sensing elements individually coacting with corresponding ones of said digit signalling channels to provide digital output signal combinations the values of the digital outputs of said sensing members varying according to different functions of the displacement of said reference movable member from said associated reference position; means coupled to said input and reference movable members for producing a control signal only when the relative displacements thereof, correspond; means for independently moving said reference member in relation to said input member; utilization means; means coupled between ducing means and said gating means for enabling said gating said digit output signals from a selected one of said sensing members to said utilization means; and second selection means coupled between said control signal producing means and said gating means for enabling said gating means in response to control signals obtained from said producing means, and thus when said reference movable member is moved to a predetermined displacement position relative to said input member displacement.

3. A system for producing motion at a rate which is functionally related to the position of a moving member, said system comprising an input movable member and a reference movable member, each having an associated reference position, means for comparing the relative displacements of said members from said associated reference positions, said comparing means providing a control signal output only when said members are at predetermined relative displacements from said respectively associated reference positions, a plurality of encoding members mounted on said reference member, a plurality of stationary sensing members coacting with corresponding ones of said encoding members to provide digital signals representing numerical values which vary according to associated functions of the position of said reference member, means for selecting the digital output of any one of said stationary sensing members, means for gating said selected digital output in response to said control signal output provided by said comparing means, means associated with said sensing members for delaying operation of said gating means if said reference member is at a position at which the digital output of said selected sensing member is ambiguous, until the said reference number has passed out of said position, means for storing said selected digital output transferred by said gating means, means coupled to said storing means for converting said stored output to an analog signal having an amplitude corresponding to the numerical value of said stored output, means coupled to said converting means and to said input movable member, for moving said input movable member at a rate determined by the amplitude of said analog signal, and means for independently moving said reference movable member.

4. A system for producing code signals corresponding to a selected function of the position of a selected movable member comprising a plurality of input movable members; comparing means; means for coupling a selected one of said input members to said comparing means; a reference movable member coupled to said comparing means; said comparing means being operative to provide an output control signal only when said selected input member and said reference member are at corresponding positions; a plurality of encoding members associated with said reference member, said encoding members providing different coded digital indications corresponding to different functions of the position of said reference member, and ambiguity mark indications at positions at which said respective coded indications are ambiguous; and means coupled to said comparing means and said encoding members for gating out the coded indication of a selected one of said encoding members, means for enabling said gating means in response to said output control signal of said comparing means providing said output control signal is not coincident with any of said ambiguity mark indications of said selected encoding member, said enabling means being otherwise operative to enable said gating means within a predetermined time interval following termination of said ambiguity mark indication.

References Cited by the Examiner

UNITED STATES PATENTS

| | | | |
|---|---|---|---|
| 2,494,922 | 1/50 | Yardeny | 340—204 |
| 2,630,481 | 3/53 | Johnson | 340—204 |
| 2,685,054 | 7/54 | Brenner | 340—204 |
| 2,755,020 | 7/56 | Belcher | 340—347.3 |
| 2,792,545 | 5/57 | Kamm | 340—347.2 |
| 2,981,107 | 4/61 | Anderson | 340—187 |
| 3,034,053 | 5/62 | Lanning | 340—198 |

NEIL C. READ, *Primary Examiner.*

L. MILLER ANDRUS, THOMAS B. HABECKER,
*Examiners.*